(12) United States Patent
Shveidel et al.

(10) Patent No.: US 11,068,199 B2
(45) Date of Patent: Jul. 20, 2021

(54) SYSTEM AND METHOD FOR AGGREGATING METADATA CHANGES IN A STORAGE SYSTEM

(71) Applicant: EMC IP Holding Company, LLC, Hopkinton, MA (US)

(72) Inventors: Vladimir Shveidel, Pardes-Hana (IL); Ronen Gazit, Tel Aviv (IL); Uri Shabi, Tel Mond (IL); Alex Soukhman, Raanana (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 72 days.

(21) Appl. No.: 16/260,660

(22) Filed: Jan. 29, 2019

(65) Prior Publication Data
US 2020/0241793 A1 Jul. 30, 2020

(51) Int. Cl.
*G06F 3/06* (2006.01)
*G06F 16/22* (2019.01)

(52) U.S. Cl.
CPC .......... *G06F 3/0655* (2013.01); *G06F 3/0604* (2013.01); *G06F 3/0673* (2013.01); *G06F 16/2255* (2019.01)

(58) Field of Classification Search
CPC .... G06F 3/0655; G06F 3/0604; G06F 3/0673; G06F 16/2255
See application file for complete search history.

(56) References Cited

U.S. PATENT DOCUMENTS

| | | | |
|---|---|---|---|
| 9,836,243 B1 * | 12/2017 | Chanler | G11C 16/3495 |
| 2011/0307447 A1 * | 12/2011 | Sabaa | G06F 16/24556 707/637 |
| 2015/0317326 A1 * | 11/2015 | Bandarupalli | G06F 16/24565 707/813 |
| 2016/0077746 A1 * | 3/2016 | Muth | G06F 3/0608 711/159 |
| 2017/0277709 A1 * | 9/2017 | Strauss | G06F 3/0631 |
| 2018/0285198 A1 * | 10/2018 | Dantkale | G06F 12/0811 |
| 2018/0307609 A1 * | 10/2018 | Qiang | G06F 12/0875 |

* cited by examiner

*Primary Examiner* — Michael Krofcheck
(74) *Attorney, Agent, or Firm* — Brian J. Colandreo; Mark H. Whittenberger; Holland & Knight LLP (57) ABSTRACT

A method, computer program product, and computing system for associating each data container of a first set of data containers in volatile memory with a metadata page. One or more metadata changes associated with a metadata page may be written to the data container associated with the metadata page. The one or more metadata changes stored in the first set of data containers may be written to a storage array.

18 Claims, 7 Drawing Sheets

```
┌─────────────────────────────────────┐        ┌─────────────────────────────────────────┐
│ 10                                  │        │ determining a target data container for  │
│  ┌───────────────────────────────┐  │        │ writing the one or more metadata changes │
│  │ associating each data         │  │        │ based upon, at least in part, a hash     │
│  │ container of a first set of   │  │        │ function of an index of the metadata     │
│  │ data containers in volatile   │  │        │ page associated with the one or more     │
│  │ memory with a metadata page   │  │        │ metadata changes                         │
│  └───────────────────────────────┘  │        └─────────────────────────────────────────┘
│    400                              │                                      \_406
│              │                      │                     │
│              ▼                      │                     ▼
│  ┌───────────────────────────────┐  │        ┌─────────────────────────────────────────┐
│  │ writing one or more metadata  │  │        │ writing metadata changes to the first   │
│  │ changes associated with a     │  │        │ set of data containers until at least   │
│  │ metadata page to the data     │  │        │ one data container of the first set of  │
│  │ container associated with the │  │        │ data container is full                  │
│  │ metadata page                 │  │        └─────────────────────────────────────────┘
│  └───────────────────────────────┘  │                                      \_408
│    402                              │                     │
│              │                      │                     ▼
│              ▼                      │        ┌─────────────────────────────────────────┐
│  ┌───────────────────────────────┐  │        │ switching the first set of data         │
│  │ writing the one or more       │  │        │ containers with a second set of data    │
│  │ metadata changes stored in    │  │        │ containers when the at least one data   │
│  │ the first set of data         │  │        │ container of the first set of data      │
│  │ containers to a storage array │  │        │ container is full                       │
│  └───────────────────────────────┘  │        └─────────────────────────────────────────┘
│    404                              │                                      \_410
│              │                      │                     │
│              │                      │                     ▼
│              │                      │        ┌─────────────────────────────────────────┐
│              │                      │        │ writing the one or more metadata        │
│              │                      │        │ changes to the second set of data       │
│              │                      │        │ containers                              │
│              │                      │        └─────────────────────────────────────────┘
│              │                      │                                      \_412
│              │◄─────────────────────┴──────────────────────┘
│              ▼
│  ┌───────────────────────────────┐           ┌─────────────────────────────────────────┐
│  │ receiving a read request for  │           │ writing the one or more metadata        │
│  │ a metadata page stored in the │           │ changes stored in each data container   │
│  │ storage array                 │           │ to a separate data container page of a  │
│  └───────────────────────────────┘           │ set of data container pages in the      │
│    416                                       │ storage array, wherein each data        │
│              │                               │ container page is associated with a     │
│              ▼                               │ metadata page                           │
│  ┌───────────────────────────────┐           └─────────────────────────────────────────┘
│  │ identifying the data          │                                        \_414
│  │ container from the first set  │                          │
│  │ of data containers in the     │                          ▼
│  │ volatile memory that is       │           ┌─────────────────────────────────────────┐
│  │ associated with the metadata  │           │ combining a plurality of data container │
│  │ page of the read request      │           │ pages associated with a metadata page   │
│  └───────────────────────────────┘           │ from a plurality of sets of data        │
│    418                                       │ container pages in the storage array,   │
│              │                               │ thus defining a data container working  │
│              ▼                               │ set                                     │
│  ┌───────────────────────────────┐           └─────────────────────────────────────────┘
│  │ identifying one or more       │                                        \_428
│  │ metadata changes from the     │                          │
│  │ identified data container     │                          ▼
│  └───────────────────────────────┘           ┌─────────────────────────────────────────┐
│    420                                       │ reading the metadata page from the      │
│              │                               │ storage array                           │
│              ▼                               └─────────────────────────────────────────┘
│  ┌───────────────────────────────┐                                        \_430
│  │ reading the metadata page     │                          │
│  │ from the storage array        │                          ▼
│  └───────────────────────────────┘           ┌─────────────────────────────────────────┐
│    422                                       │ merging the one or more identified      │
│              │                               │ metadata changes from the data          │
│              ▼                               │ container working set and the metadata  │
│  ┌───────────────────────────────┐           │ page read from the storage array, thus  │
│  │ merging the one or more       │           │ defining an updated metadata page       │
│  │ identified metadata changes   │           └─────────────────────────────────────────┘
│  │ with the metadata page read   │                                        \_432
│  │ from the storage array, thus  │                          │
│  │ defining a current metadata   │                          ▼
│  │ page                          │           ┌─────────────────────────────────────────┐
│  └───────────────────────────────┘           │ writing the updated metadata page to    │
│    424                                       │ the storage array                       │
│              │                               └─────────────────────────────────────────┘
│              ▼                                                            \_434
│  ┌───────────────────────────────┐
│  │ providing the current         │
│  │ metadata page in response to  │
│  │ the read request              │
│  └───────────────────────────────┘
│    426
```

SYSTEM AND METHOD FOR AGGREGATING METADATA CHANGES IN A STORAGE SYSTEM

BACKGROUND

Storing and safeguarding electronic content may be beneficial in modern business and elsewhere. Accordingly, various methodologies may be employed to protect and distribute such electronic content. For example, changes to data and metadata of a storage system may be stored in journals and/or logs in memory before writing the changes to a storage array.

Conventional storage systems may apply various input/output (IO) schemes to improve write performance. For example, data and metadata from an IO write operation may be initially stored in a journal, to provide a quick acknowledgment signal to a client computing device, and subsequently stored in a persistent storage of a storage array. However, journals may be generated in a non-volatile memory which may be an expensive resource with limited space for storing data and metadata. For example, in conventional storage systems, these journals may be unable to accommodate more than a few seconds of IO traffic.

SUMMARY OF DISCLOSURE

In one example implementation, a computer-implemented method executed on a computing device may include but is not limited to associating each data container of a first set of data containers in volatile memory with a metadata page. One or more metadata changes associated with a metadata page may be written to the data container associated with the metadata page. The one or more metadata changes stored in the first set of data containers may be written to a storage array.

One or more of the following example features may be included. Writing the one or more metadata changes to the first set of data containers may include writing metadata changes to the first set of data containers until at least one data container of the first set of data container is full. The first set of data containers may be switched with a second set of data containers when the at least one data container of the first set of data container is full. One or more subsequent metadata changes may be written to the second set of data containers. Associating each data container of the set of data containers with a metadata page may be based upon, at least in part, a hash function of an index of the metadata page. A target data container for writing the one or more metadata changes may be determined based upon, at least in part, a hash function of an index of the metadata page associated with the one or more metadata changes. A read request may be received for a metadata page stored in the storage array. The data container from the first set of data containers in the volatile memory that is associated with the metadata page of the read request may be identified. One or more metadata changes from the identified data container may be identified. The metadata page may be read from the storage array. The one or more identified metadata changes may be merged with the metadata page read from the storage array, thus defining a current metadata page. The current metadata page may be provided in response to the read request. Writing the one or more metadata changes stored in the first set of data containers to the storage array may include writing the one or more metadata changes stored in each data container to a separate data container page of a set of data container pages in the storage array, wherein each data container page is associated with a metadata page. A plurality of data container pages associated with a metadata page from a plurality of sets of data container pages in the storage array may be combined, thus defining a data container working set. The metadata page may be read from the storage array. The one or more metadata changes from the data container working set and the metadata page read from the storage array may be merged, thus defining an updated metadata page. The updated metadata page may be written to the storage array.

In another example implementation, a computer program product resides on a computer readable medium that has a plurality of instructions stored on it. When executed by a processor, the instructions cause the processor to perform operations that may include but are not limited to associating each data container of a first set of data containers in volatile memory with a metadata page. One or more metadata changes associated with a metadata page may be written to the data container associated with the metadata page. The one or more metadata changes stored in the first set of data containers may be written to a storage array.

One or more of the following example features may be included. Writing the one or more metadata changes to the first set of data containers may include writing metadata changes to the first set of data containers until at least one data container of the first set of data container is full. The first set of data containers may be switched with a second set of data containers when the at least one data container of the first set of data container is full. One or more subsequent metadata changes may be written to the second set of data containers. Associating each data container of the set of data containers with a metadata page may be based upon, at least in part, a hash function of an index of the metadata page. A target data container for writing the one or more metadata changes may be determined based upon, at least in part, a hash function of an index of the metadata page associated with the one or more metadata changes. A read request may be received for a metadata page stored in the storage array. The data container from the first set of data containers in the volatile memory that is associated with the metadata page of the read request may be identified. One or more metadata changes from the identified data container may be identified. The metadata page may be read from the storage array. The one or more identified metadata changes may be merged with the metadata page read from the storage array, thus defining a current metadata page. The current metadata page may be provided in response to the read request. Writing the one or more metadata changes stored in the first set of data containers to the storage array may include writing the one or more metadata changes stored in each data container to a separate data container page of a set of data container pages in the storage array, wherein each data container page is associated with a metadata page. A plurality of data container pages associated with a metadata page from a plurality of sets of data container pages in the storage array may be combined, thus defining a data container working set. The metadata page may be read from the storage array. The one or more metadata changes from the data container working set and the metadata page read from the storage array may be merged, thus defining an updated metadata page. The updated metadata page may be written to the storage array.

In another example implementation, a computing system includes at least one processor and at least one memory architecture coupled with the at least one processor, wherein the computing system is configured to perform operations that may include but are not limited to associating each data container of a first set of data containers in volatile memory with a metadata page. One or more metadata changes associated with a metadata page may be written to the data container associated with the metadata page. The one or more metadata changes stored in the first set of data containers may be written to a storage array.

One or more of the following example features may be included. Writing the one or more metadata changes to the first set of data containers may include writing metadata changes to the first set of data containers until at least one data container of the first set of data container is full. The first set of data containers may be switched with a second set of data containers when the at least one data container of the first set of data container is full. One or more subsequent metadata changes may be written to the second set of data containers. Associating each data container of the set of data containers with a metadata page may be based upon, at least in part, a hash function of an index of the metadata page. A target data container for writing the one or more metadata changes may be determined based upon, at least in part, a hash function of an index of the metadata page associated with the one or more metadata changes. A read request may be received for a metadata page stored in the storage array. The data container from the first set of data containers in the volatile memory that is associated with the metadata page of the read request may be identified. One or more metadata changes from the identified data container may be identified. The metadata page may be read from the storage array. The one or more identified metadata changes may be merged with the metadata page read from the storage array, thus defining a current metadata page. The current metadata page may be provided in response to the read request. Writing the one or more metadata changes stored in the first set of data containers to the storage array may include writing the one or more metadata changes stored in each data container to a separate data container page of a set of data container pages in the storage array, wherein each data container page is associated with a metadata page. A plurality of data container pages associated with a metadata page from a plurality of sets of data container pages in the storage array may be combined, thus defining a data container working set. The metadata page may be read from the storage array. The one or more metadata changes from the data container working set and the metadata page read from the storage array may be merged, thus defining an updated metadata page. The updated metadata page may be written to the storage array.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 4 is an example flowchart of the metadata change aggregation process of FIG. 1 according to one or more example implementations of the disclosure.

Like reference symbols in the various drawings indicate like elements.

DETAILED DESCRIPTION

System Overview

Figure 1:
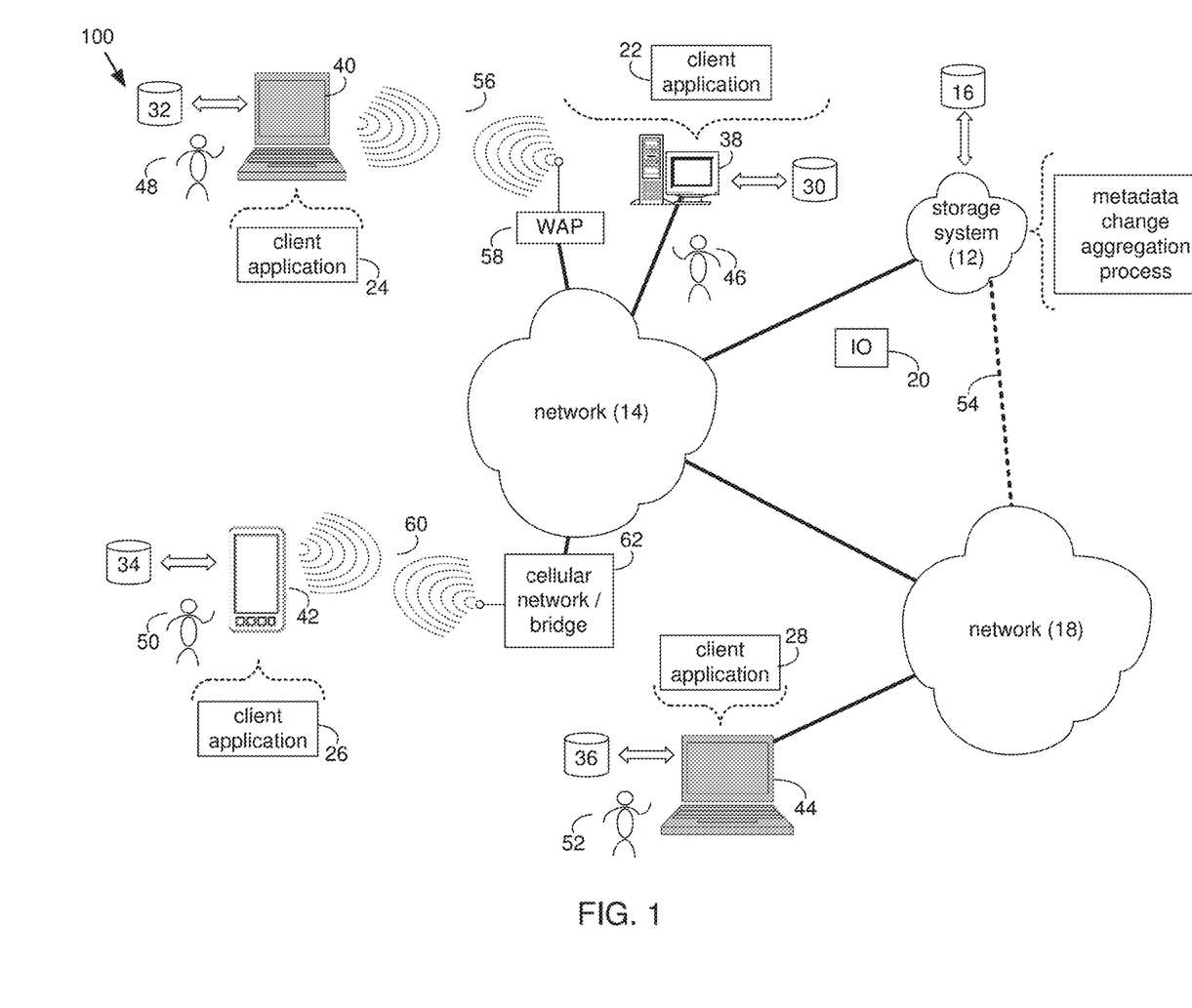
FIG. 1 is an example diagrammatic view of a storage system and a metadata change aggregation process coupled to a distributed computing network according to one or more example implementations of the disclosure.

Referring to FIG. 1, there is shown metadata change aggregation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of metadata change aggregation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of metadata change aggregation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives;

tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a metadata change aggregation process, such as metadata change aggregation process 10 of FIG. 1, may include but is not limited to, associating each data container of a first set of data containers in volatile memory with a metadata page. One or more metadata changes associated with a metadata page may be written to the data container associated with the metadata page. The one or more metadata changes stored in the first set of data containers may be written to a storage array.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
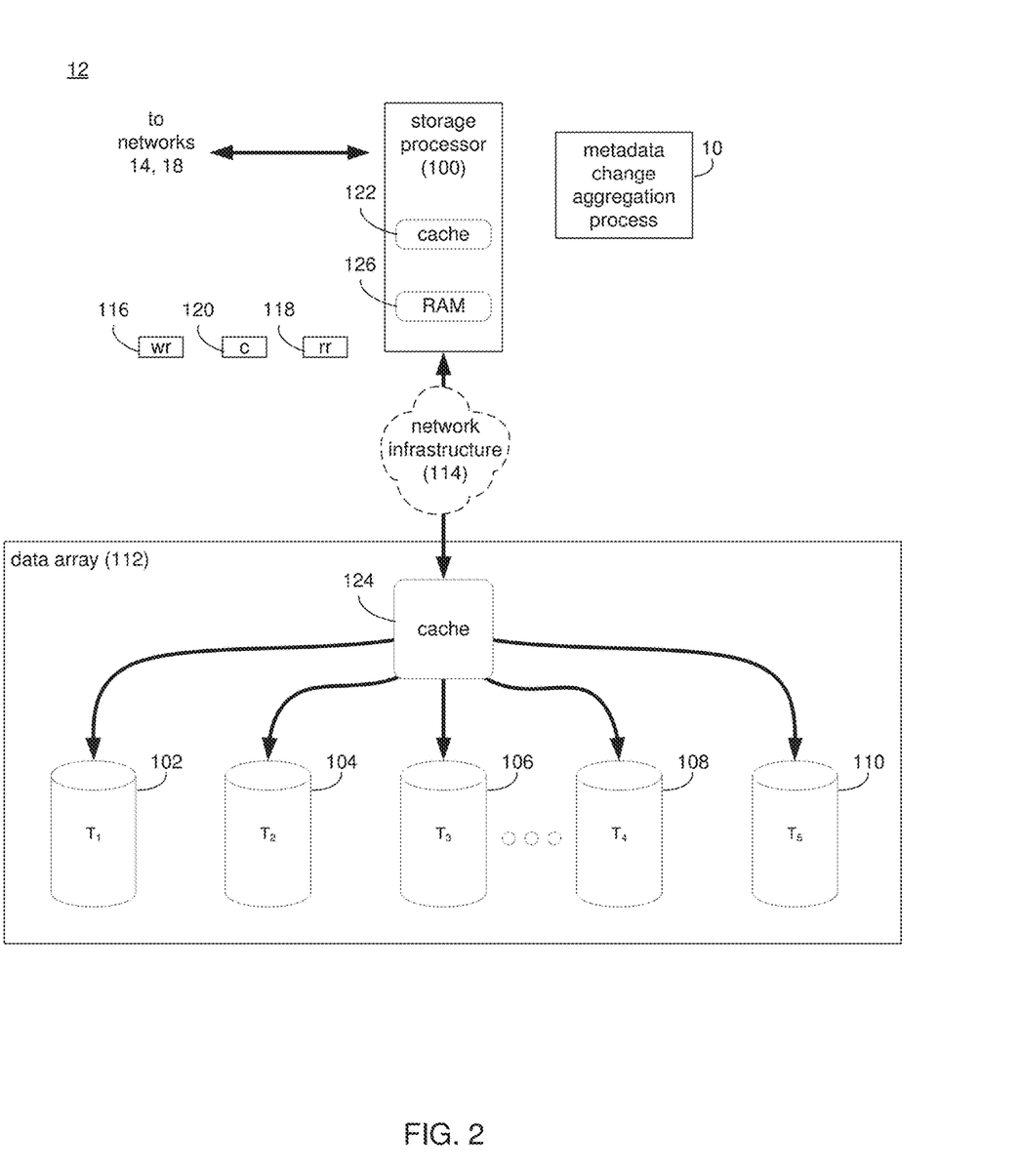
FIGS. 2-3 are example diagrammatic views of the storage system of FIG. 1 according to one or more example implementations of the disclosure.

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of metadata change aggregation process 10. The instruction sets and subroutines of metadata change aggregation process 10, which may be stored on a storage device (e.g., storage device 16) coupled to storage processor 100, may be executed by one or more processors (not shown) and one or more memory architectures (not shown) included within storage processor 100. Storage device 16 may include hut is not limited to: a hard disk drive; a tape drive; an optical drive; a RAID device; a random access memory (RAM); a read-only memory (ROM); and all forms of flash memory storage devices. As discussed above, some portions of the instruction sets and subroutines of metadata change aggregation process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of metadata change aggregation process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of metadata change aggregation process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Metadata Architecture

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That's typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/IOPs than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
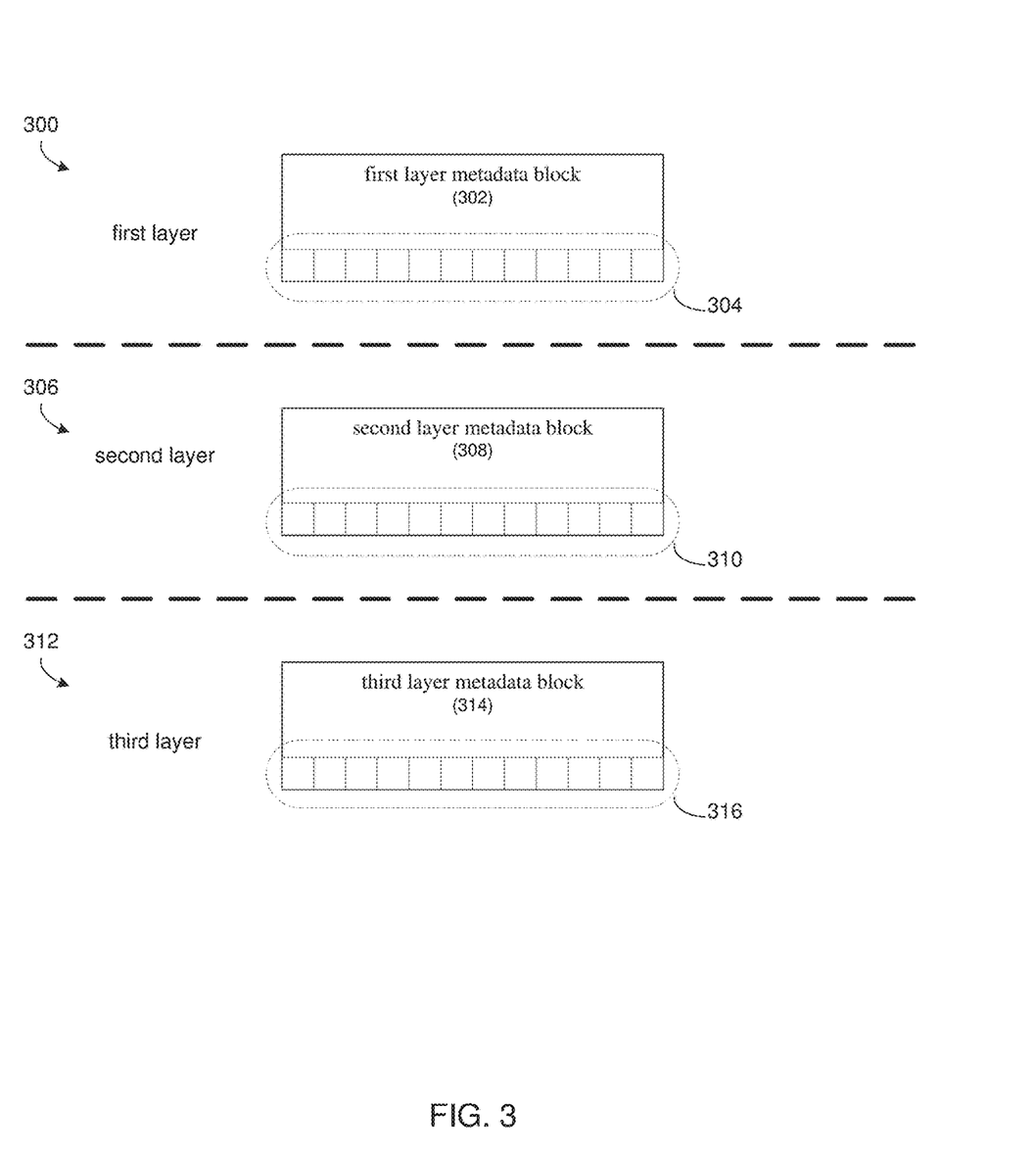

Referring also to FIG. 3, a storage system may generally include three layers of metadata blocks. While the following example includes metadata "blocks", it will be appreciated that other units of data storage may be used within the scope of the present disclosure. In some implementations, a first layer (e.g., first layer 300) may include first layer metadata blocks (e.g., first layer metadata block 302) with a plurality of entries (e.g., plurality of entries 304) that map or point to a plurality of entries of one or more second layer metadata blocks. The first layer may (e.g., first layer 300) represent various ranges of Logical Block Addresses (LBAs). For example, each entry of the plurality of entries (e.g., plurality of entries 304) of the first layer metadata blocks (e.g., first layer metadata block 302) may be associated with a LBA range. In some implementations, the first layer (e.g., first layer 300) may be organized in a "tree" data structure where each "leaf" of the "tree" data structure corresponds to a specific LBA range. Accordingly, each first layer metadata block (e.g., first layer metadata block 302) may hold mapping of a LBA to a second layer metadata block. It will be appreciated that other data structures may be used within the scope of the present disclosure to organize the first layer.

In some implementations, a second layer (e.g., second layer 306) may include second layer metadata blocks (e.g., second layer metadata block 308) with a plurality of entries (e.g., plurality of entries 310) that map to a plurality of entries of one or more third layer metadata blocks. The second layer (e.g., second layer 306) may generally isolate the logical address of a block from the physical location of the block. For example, a second layer metadata block (e.g., second layer metadata block 308) may encapsulate the physical location of user data and allow relocation without updating first layer metadata blocks (e.g., first layer metadata block 302). Accordingly, the second layer (e.g., second layer 306) may decouple the Logical Block Address space address from the physical one.

In some implementations, a third layer (e.g., third layer 312) may include third layer metadata blocks (e.g., third layer metadata block 314) with a plurality of entries or portions (e.g., plurality of entries 316) that are configured to store user data. In this manner, the third layer (e.g., third layer 312) may describe the physical location of user data in a storage system. In some implementations, each third layer metadata block (e.g., third layer metadata block 314) may also be referred to as a metadata page and may have a predefined amount of storage capacity (e.g., 4 kilobytes) for storing metadata (e.g., user data). As will be discussed in greater detail below, third layer metadata blocks (e.g., third layer metadata block 314) may be stored in a storage array (e.g., on one of storage targets 102, 104, 106, 108 of storage array 112).

The Metadata Change Aggregation Process

Referring also to FIGS. 4-7 and in some implementations, metadata change aggregation process 10 may associate 400 each data container of a first set of data containers in volatile memory with a metadata page. One or more metadata changes associated with a metadata page may be written 402 to the data container associated with the metadata page. The one or more metadata changes stored in the first set of data containers may be written 404 to a storage array.

As will be discussed in greater detail below, in many storage systems, data may be changed e.g., thousands of times per second. The ability to securely store data may be balanced against the speed at which the data, including changes to the data, may be stored. For example, the ability to process write requests may generally include the actions of receiving an IO write request, determining the destination of the new data of the write request, reading any pre-existing data, storing the new data, and acknowledging that the new data was stored. Consider an example where two write requests are received within a very short time frame and require modifying the same data. Each write request may specify a different modification to the same data. As such, each write request may include separate reads and writes to the same data in the storage array. As will be discussed in greater detail below, embodiments of the present disclosure may allow changes to data of a storage system to be aggregated before accessing the data from the storage system. Additionally, embodiments of the present disclosure may allow efficient read operations to be performed on the changes to the data even before the changes are applied to the data stored in the storage system.

In some implementations, metadata change aggregation process 10 may associate 400 each data container of a first set of data containers in volatile memory with a metadata page. In some implementations, a data container may generally include a data structure for storing one or more metadata changes or "deltas". In some implementations, the first set of data containers may include data structures of the same kind or different kinds or types of data structures. In some implementations and as will be discussed in greater detail below, the first set of data containers may be a set of hash-based sorted buckets. Each data container or bucket of the first set of data containers or buckets may be associated with a particular metadata page. For example and as will be discussed in greater detail below, each data container may store one or more changes associated with a particular metadata page. The first set of data containers may be stored in volatile memory. Volatile memory may generally include any temporary memory of a storage system. In one example, the memory may include Random Access Memory-(RAM) based storage within a storage processor (e.g., RAM-based storage 126 in storage processor 100). RAM-based memory system 126 may include non-persistent RAM-based storage. As is known in the art, non-persistent RAM-based storage is RAM-based storage that will lose its data in the event of e.g., a power failure. However, it will be appreciated that other forms or types of volatile memory may be used within the scope of the present disclosure.

In some implementations, associating 400 each data container of the set of data containers with a metadata page may be based upon, at least in part, a hash function of an index of the metadata page. For example, each metadata page may have an index for identifying or locating the metadata page. In some implementations, metadata change aggregation process 10 may perform a hash function on the logical index of the metadata page to associate a data container with a metadata page. In this manner, metadata change aggregation process 10 may randomize data containers or bucket access and filling in case of sequential or other non-random patterns. Accordingly, the set of data containers may be more balanced.

Figure 5:
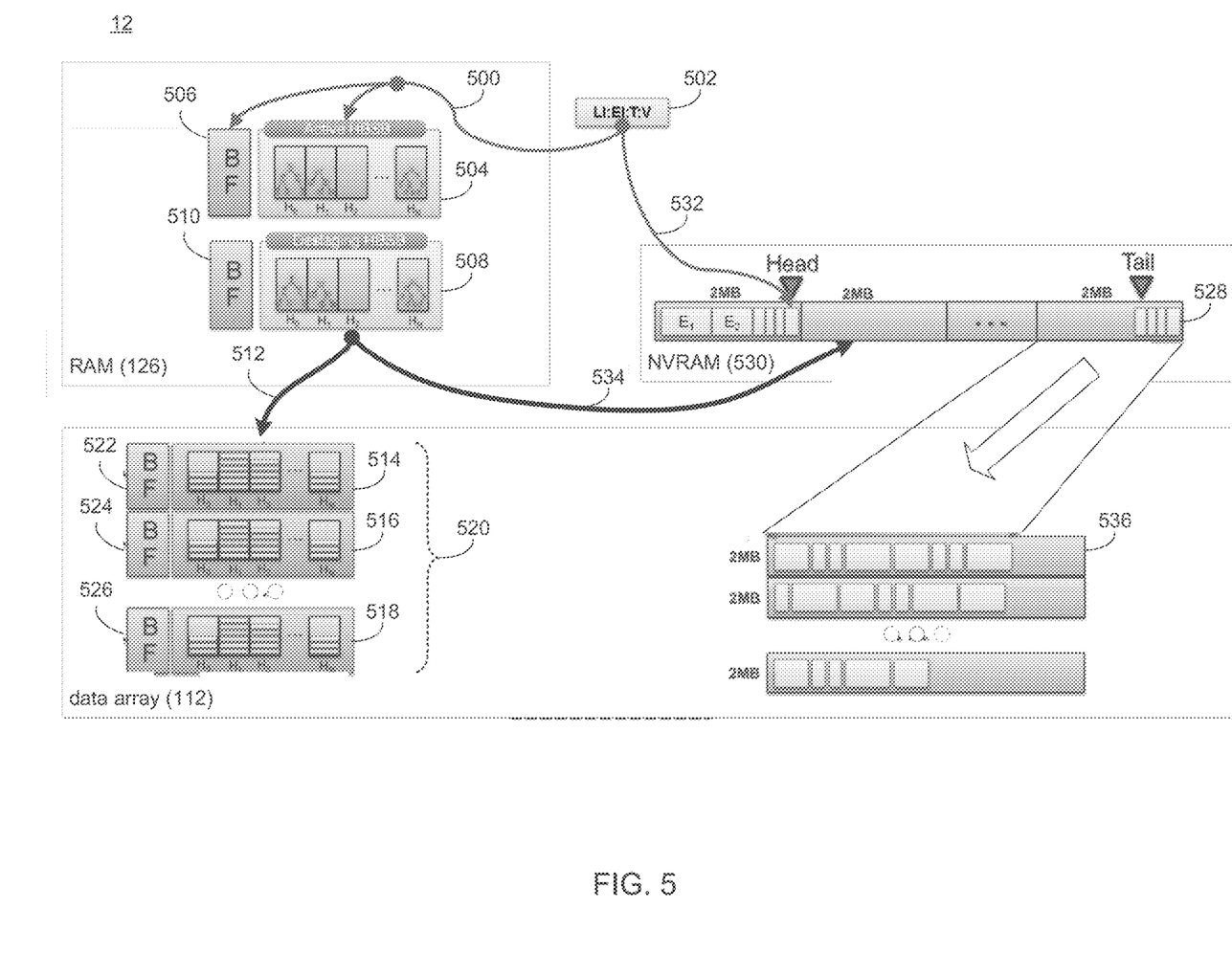
FIGS. 5-7 are example diagrammatic views of the metadata change aggregation process of FIG. 1 according to one or more example implementations of the disclosure.

In some implementations, metadata change aggregation process 10 may write 402 one or more metadata changes associated with a metadata page to the data container associated with the metadata page. Referring also to FIG. 5 and in some implementations, metadata change aggregation process 10 may receive one or more metadata changes associated with a metadata page. As discussed above, a storage processor (e.g., storage processor 100) may receive an IO write request that may specify a change to data and metadata within the storage array (e.g., data array 112). As discussed above, each portion of metadata may be stored in the storage array (e.g., data array 112) in a metadata page. Accordingly, the one or more changes may specify changes to a metadata page in the storage array.

In some implementations, the one or more metadata changes or deltas may be received or converted (e.g., by the storage processor) into a metadata update tuple. Referring to the example of FIG. 5 and in some implementations, the metadata update tuple may include various entries including, but not limited to, a logical index of a metadata page, an entry index referring to a specific entry or offset inside the metadata page, a record or delta type that defines the size of the delta, the payload or new value of the entry in the metadata page, etc. It will be appreciated that other information associated with a metadata change or delta may be defined in a metadata update tuple.

In some implementations, metadata change aggregation process 10 may determine 406 a target data container for writing the one or more metadata changes based upon, at least in part, a hash function of an index of the metadata page associated with the one or more metadata changes. For example, metadata change aggregation process 10 may determine the logical index of the metadata page from the metadata update tuple and perform a hash function on the logical index to determine a target data container for writing the more metadata changes. As discussed above, the same hash function may be used to associate specific data containers or bucket from a first set of data containers or hash based sorted buckets with a metadata page based upon, at least in part, the logical index of the metadata page.

Referring again to FIG. 5 and in some implementations, metadata change aggregation process 10 may route (represented by arrow 500) each delta or metadata change metadata update tuple 502) to a specific data container or bucket of the first set of data containers (e.g., first set of data containers 504) according to the hash function taken from the logical index. In some implementations, each data container of the first set of data containers (e.g., first set of data containers 504) may be organized as a binary tree of deltas or metadata changes. For example, upon writing 402 the metadata change to a specific data container, metadata change aggregation process 10 may sort the metadata changes based upon, at least in part, an insertion order. In other words, each metadata change may be sorted in the binary tree structure within the data container based on when the metadata change was received. While a binary tree structure has been described, it will be appreciated that various sorting algorithms or data structures may be used within the scope of the present disclosure.

In some implementations, each set of data containers may be associated with a bloom filter. As is known in the art, a bloom filter is a data structure designed to determine, rapidly and memory-efficiently, whether an element is present in a set. In some implementations, the bloom filter may decrease the number of searches in the set of data containers in volatile memory. In some implementations, a bloom filter may determine whether or not a set of data containers includes one or more metadata changes for a particular metadata page. For example, a bloom filter (e.g., bloom filter 506) may implement false positive logic (i.e., the negative response from a bloom filter guarantees to a reasonably high accuracy rate) that there are not any metadata changes associated with a particular metadata page. In some implementations, each time a metadata change is written 402 to the first set of data containers, the bloom filter associated with the first set of data containers may be updated to reflect this metadata change.

In some implementations, writing 402 the one or more metadata changes to the first set of data containers may include writing 408 metadata changes to the first set of data containers until at least one data container of the first set of data container is full. In some implementations, each data container may have a pre-defined data limit before the data container is considered "full". For example and as will be discussed in greater detail below, each data container may be written to the storage array as a separate page (e.g., 4 KB). In this example, the page size may determine the pre-defined data limit of a data container. In other words, once a data container includes a page-worth of metadata changes, metadata change aggregation process 10 may determine that the data container is "full".

In some implementations, metadata change aggregation process 10 may switch 410 the first set of data containers with a second set of data containers when the at least one data container of the first set of data container is full. The second set of data containers may be identical to the first set of data containers but may be empty at the time of switching. In other words, metadata change aggregation process 10 may associate each data container of the second set of data containers with a metadata page when associating 400 each data container of the first set of data containers with a metadata page. As discussed above, the second set of data containers may also include a set of hash-based sorted buckets. In some implementations, when the first set of data containers is being filled with one or more metadata changes, the first set of data containers may be considered the "active" set of data containers and the second set of data containers may be considered the "destaging" set of the data containers. As will be discussed in greater detail below, destaging may generally include writing the one or more metadata changes from a set of data containers to the storage array.

Referring again to FIG. 5 and in some implementations, the second set of data containers (e.g., second set of data containers 508) may be configured to switch with the first set of data containers (e.g., first set of data containers 504) when at least one data container of the first set of data containers (e.g., first set of data containers 504) is full. In some implementations, metadata change aggregation process 10 may write 412 one or more subsequent metadata changes to the second set of data containers. For example and in response to switching the second set of data containers with the first set of data containers, metadata change aggregation process 10 may write 412 one or more subsequent metadata changes (i.e., metadata changes received after switching the second set of data containers with the first set of data containers) to the second set of data containers. In some implementations, the second set of data containers may be associated with a bloom filter (e.g., bloom filter 510).

In some implementations, metadata change aggregation process 10 may write 404 the one or more metadata changes stored in the first set of data containers to a storage array. Referring again to the example of FIG. 5 and in some implementations, metadata change aggregation process 10 may receive one or more metadata changes and write 402 those metadata changes to various data containers of the first set of data containers. In some implementations and as discussed above, metadata change aggregation process 10 may determine that at least one data container of the first set of data containers is full. Metadata change aggregation process 10 may switch 410 a second set of data containers (e.g., second set of data containers 508) with the first set of data containers (e.g., first set of data containers 504). In response to switching 410 the first set of data containers with the second set of data containers, metadata change aggregation process 10 may write 412 one or more subsequent metadata changes to the second set of data containers (e.g., second set of data containers 508) and may write 404 the one or more metadata changes stored in the first set of data containers (e.g., first set of data containers 504) to a storage array (e.g., data array 112).

In some implementations, writing 404 the one or more metadata changes stored in the first set of data containers to the storage array may include writing 414 the one or more metadata changes stored in each data container to a separate data container page of a set of data container pages in the storage array, wherein each data container page is associated with a metadata page. For example and referring also to the example of FIG. 5, metadata change aggregation process 10 may write 404 (represented with arrow 512) the one or more metadata changes from the first set of data containers first set of data containers 504) to the storage array (e.g., data array 112) by writing 414 the one or more metadata changes stored in each data container to a separate data container page of a set of data container pages (e.g., set of data container pages 514, 516, 518). In this manner, the one or more metadata changes from each data container of the first set of data containers may be written 414 to a corresponding data container page of a set of data container pages set of data container pages 514, 516, 518). Accordingly, a particular set of data container pages (e.g., set of data container pages 514, 516, 518) may store the one or more metadata changes of a particular set of data containers (e.g., first set of data containers 514, 516, 518) in volatile memory (e.g., RAM 126).

As discussed above and in some implementations, each data container page or "bucket page" may have a pre-defined size of a metadata page (e.g., 4 KB). Similar to the set of data containers stored in volatile memory, each set of data container pages or "tablet" may have a data container page associated with a respective metadata page. In some implementations, a data container page may sort the one or more metadata changes for a particular metadata page by insertion time. In some implementations, a set of active tablets or multiple sets of data container pages (e.g., set of data container pages 514, 516, 518) may be organized in a storage array (e.g., data array 112) as a ring buffer (e.g., ring buffer 520). For example, a set of data container pages or a tablet may be added to a "head" of the ring buffer (e.g., ring buffer 520) and released or deleted from a "tail" of the ring buffer. The process of releasing or deleting a set of data container pages will be described in greater detail below.

In some implementations, the bloom filter associated with each set of data containers in volatile memory may be written to the storage array. For example, bloom filter 506 associated with first set of data containers 504 may be written to the storage array (e.g., data array 112) as bloom filter 522 while the first set of data containers 504 is written to set of data container pages 514. As will be discussed in greater detail below, the bloom filters associated with each set of data containers may be preserved in the form of bloom filters (e.g., bloom filters 522, 524, 526) associated with each set of data container pages (e.g., set of data container pages 514, 516, 518) to help reduce unnecessary searches in the one or more sets of data container pages (e.g., set of data container pages 514, 516, 518).

In some implementations and in response to writing 404 the one or more metadata changes from the first set of data containers, metadata change aggregation process 10 may clear the contents of each data container of the first set of data containers. Accordingly, the first set of data containers may be cleared for receiving additional metadata changes. For example and in some implementations, when metadata change aggregation process 10 determines that at least one data container of the second set of data containers (e.g., second set of data containers 508) is full, metadata change aggregation process 10 may switch the first set of data containers (e.g., first set of data containers 504) with the second set of data containers (e.g., second set of data containers 508) and write subsequent metadata changes to the data containers of the first set of data containers (e.g., first set of data containers 504) as discussed above. In response to switching the first set of data containers (e.g., first set of data containers 504) with the second set of data containers (e.g., second set of data containers 508), metadata change aggregation process 10 may write the one or more metadata changes stored in the second set of data containers (e.g., second set of data containers 508) to the storage array (e.g., data array 112). In this manner, metadata change aggregation process 10 may always have a set of data containers available for receiving metadata changes.

In some implementations, metadata change aggregation process 10 may write the one or more metadata changes to a metadata log in non-volatile memory. Referring again to the example of FIG. 5 and in some implementations, metadata change aggregation process 10 may generate a metadata log (e.g., metadata log 528) in non-volatile memory (e.g., non-volatile Random Access Memory (NVRAM) 530). In some implementations, the metadata log may store (indicated by arrow 532) metadata update tuples in time order (e.g., sorted oldest to newest). In some implementations, the contents (e.g., metadata update tuple 502) of the may preserved in the event of a power failure or other failure of the RAM (e.g., RAM 126). In some implementations and in response to the failure of the RAM (e.g., RAM 126), metadata change aggregation process 10 may recover the one or more metadata changes from the metadata log (e.g., metadata log 528).

In some implementations and in response to destaging or writing the one or more metadata changes from the first set of data containers (e.g., first set of data containers 504) to the storage array (e.g., to a set of data container pages), metadata change aggregation process 10 may release or free (indicated by arrow 534) the corresponding part of the metadata log (e.g., metadata log 528). In some implementations, metadata change aggregation process 10 may determine that the metadata log (e.g., metadata log 528) is full and may write at least a portion of the one or more metadata changes stored in the metadata log to the storage array (e.g., data array 112). In some implementations, the at least a portion of the one or more metadata changes written to the storage array may be stored as e.g., 2 MB chunks (e.g., data chunk 536) in the storage array (e.g., data array 112). While a 2 MB chunk has been discussed, it will be appreciated that the at least a portion of the one or more metadata changes may be stored in various chunks or blocks of varying sizes.

In some implementations, metadata change aggregation process 10 may receive 416 a read request for a metadata page stored in the storage array. For example, metadata change aggregation process 10 may receive 416 a read request for a metadata page stored in the storage array after changes to the metadata page have been received but before the metadata changes have been applied to the metadata page stored in the storage array. Accordingly, metadata change aggregation process 10 may allow a user to read a current metadata page including metadata changes not yet saved to the metadata page in the storage array.

In some implementations, metadata change aggregation process 10 may identify 418 the data container from the first set of data containers in the volatile memory that is associated with the metadata page of the read request. As discussed above and in some implementations, metadata change aggregation process 10 may use the logical index of the metadata page to determine a target data container or bucket in the first set of data containers. Similarly, metadata change aggregation process 10 may identify 418 the data container from the first set of data containers in the volatile memory that is associated with the metadata page of the read request based upon, at least in part, a hash function of the index or logical index of the metadata page. In some implementations with a second set of data containers, metadata change aggregation process 10 may also identify 418 the data container from the second set of data containers in the volatile memory that is associated with the metadata page of the read request based upon, at least in part, a hash function of the index or logical index of the metadata page.

In some implementations, metadata change aggregation process 10 may identify 420 one or more metadata changes from the identified data container. For example and as discussed above, metadata change aggregation process 10 may search the bloom filters (e.g., bloom filters 506, 510) associated with the first set of data containers (e.g., first set of data containers 504) and the second set of data containers (e.g., second set of data containers 508) to identify 420 one or more metadata changes from the identified data container (s). If the bloom filter indicates that the data container contains one or more metadata changes for the metadata page of the read request, metadata change aggregation process 10 may add the one or more metadata changes from the first set of data containers and/or the second set of data containers to an "unmerged metadata change set".

In some implementations, metadata change aggregation process 10 may also search the one or more sets of data container pages stored in the storage array. In a manner similar to identifying the data container from the first set of data containers in the volatile memory that is associated with the metadata page of the read request, metadata change aggregation process 10 may identify a data container page from the one or more sets of data container pages stored in the storage array. For example, metadata change aggregation process 10 may search the bloom filters (e.g., bloom filters 522, 524, 526) associated with each set of data container pages (e.g., sets of data container pages 514, 516, 518) to identify 420 one or more metadata changes from the identified data container page(s). Similarly, if the bloom filter indicates that the data container page(s) contain one or more metadata changes for the metadata page of the read request, metadata change aggregation process 10 may add the one or more metadata changes from the set of data container pages to the "unmerged metadata change set".

In some implementations, metadata change aggregation process 10 may read 422 the metadata page from the storage array. For example, metadata change aggregation process 10 may determine which metadata page to read based upon, at least in part, the logical index of the metadata page. In some implementations, the metadata page may be read from a storage array (data array 112).

In some implementations, metadata change aggregation process 10 may merge 424 the one or more identified metadata changes with the metadata page read from the storage array, thus defining a current metadata page. For example, metadata change aggregation process 10 may merge the "unmerged metadata change set" with the metadata page read from the storage array to define a current metadata page.

In some implementations, metadata change aggregation process 10 may provide 426 the current metadata page in response to the read request. In this manner, metadata change aggregation process 10 may provide 426 a current metadata page with minimal read amplification by utilizing a single search of the first set of data containers and/or the second set of data containers to identify one or more metadata changes. This is in contrast to conventional storage systems where metadata changes are not organized into respective data structures based on a metadata page. Additionally, the use of the bloom filters may help reduce unnecessary searching of data containers and/or data container pages.

Figure 6:
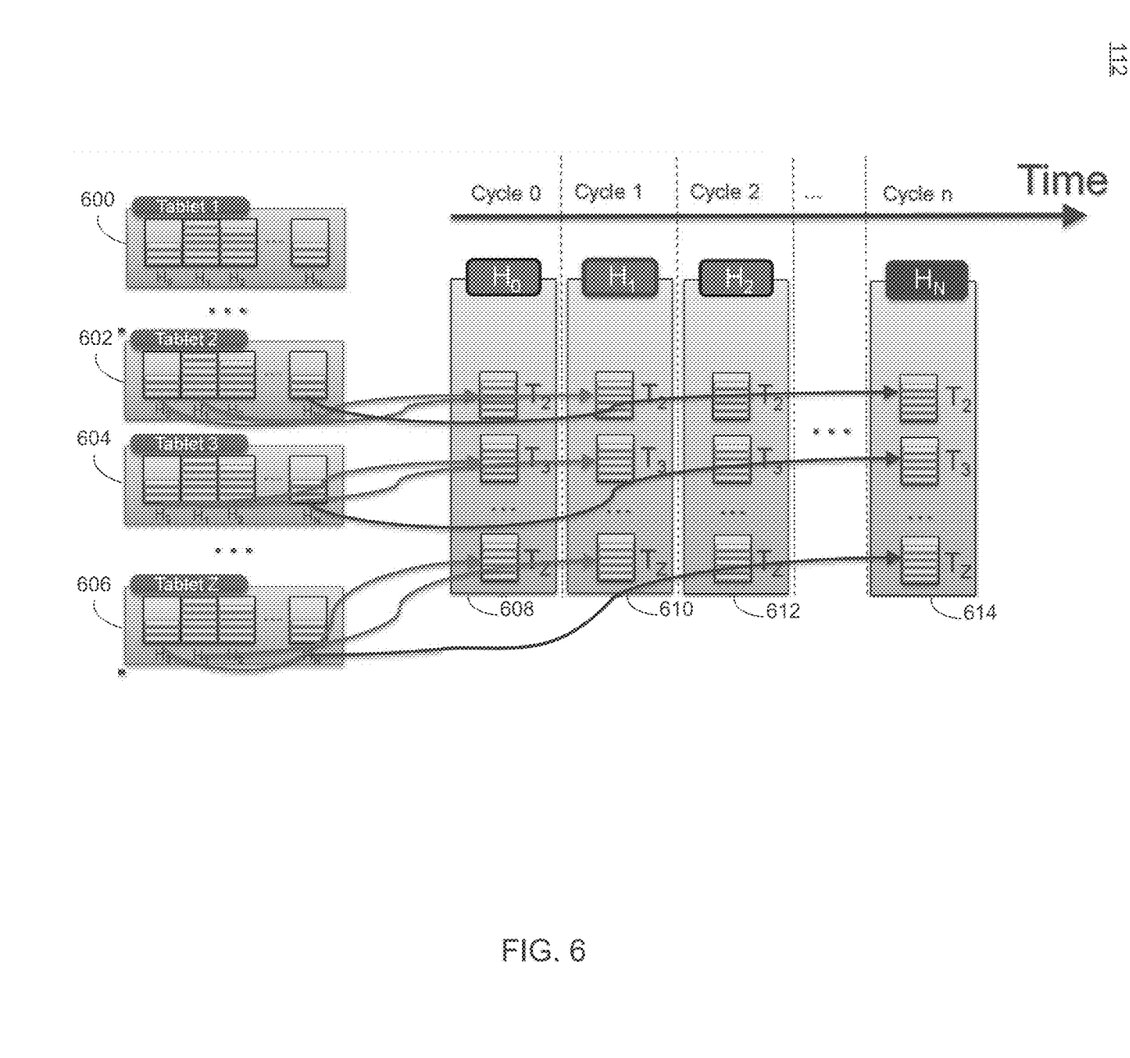

In some implementations, metadata change aggregation process 10 may aggregate the one or more metadata changes and write the one or more metadata changes to the metadata page. For example, metadata change aggregation process 10 may combine 428 a plurality of data container pages associated with a metadata page from a plurality of sets of data container pages in the storage array, thus defining a data container working set. Referring also to the example of FIG. 6, metadata change aggregation process 10 may combine a data container page associated with a particular metadata page from a plurality of sets of data container pages (e.g., set of data container pages 600, 602, 604, 606), thus defining a data container working set (e.g., data container working sets 608, 610, 612, 614). As shown in the example of FIG. 6, four sets of data container pages may include data container pages associated with (in this example) four metadata pages. Accordingly, metadata change aggregation process 10 may combine 428 the data container pages from each of the sets of data container pages (e.g., set of data container pages 600, 602, 604, 606) for each metadata page to define a data container working set or bucket working set for each metadata page (e.g., data container working sets 608, 610, 612, 614). In some implementations, metadata change aggregation process 10 may generate one data container working set per cycle. While a single data container working set per cycle has been described, it will be appreciated that any number of data container working sets may be generated per any number of cycles.

Figure 7:
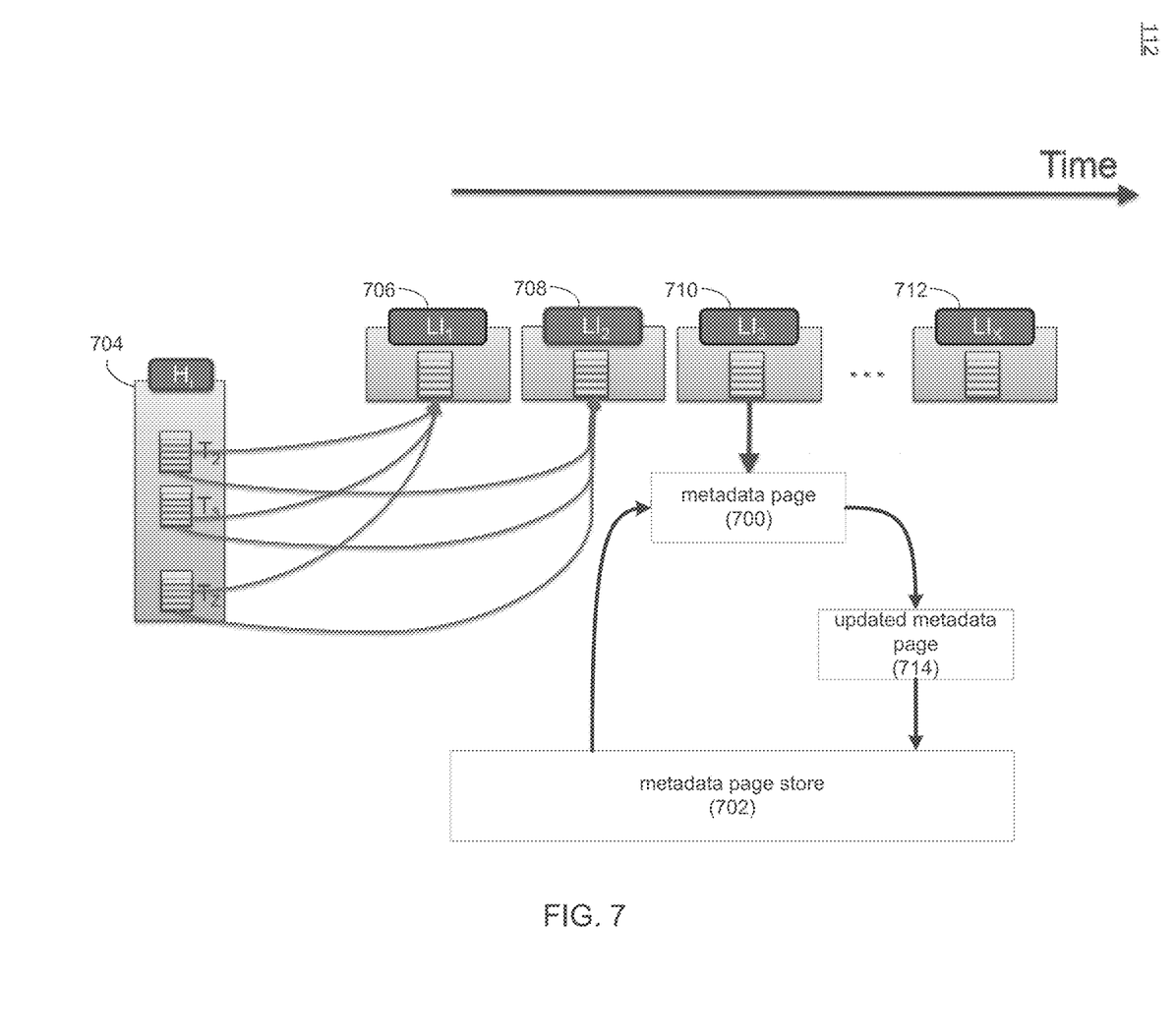

Referring also to the example of FIG. 7 and in some implementations, metadata change aggregation process 10 may read 430 the metadata page from the storage array. For example, metadata change aggregation process 10 may determine which metadata page to read based upon, at least in part, the logical index of the metadata page. In some implementations, the metadata page (e.g., metadata page 700) may be read from a metadata page store (e.g., metadata page store 702) on the storage array (data array 112).

In some implementations, metadata change aggregation process 10 may merge 432 the one or more metadata changes from the data container working set and the metadata page read from the storage array, thus defining an updated metadata page. Referring to the example of FIG. 7 and in some implementations, metadata change aggregation process 10 may sort the one or more metadata changes from a plurality of data container working sets (e.g., data container working set 704) by time, thus defining an aggregated list of metadata changes (e.g., aggregated lists 706, 708, 710, 712) for each metadata page. In response to sorting the one or more metadata changes from the data container working sets to define the aggregated list, metadata change aggregation process 10 may merge 432 the aggregated list (e.g., aggregated list 710) and the metadata page read from the storage array (e.g., metadata page 700) to generate an updated metadata page (e.g., updated metadata page 714). In some implementations, metadata change aggregation process 10 may write 434 the updated metadata page to the storage array.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope, of the disclosure defined in the appended claims.

What is claimed is:

1. A computer-implemented method, executed on a computing device, comprising:
associating, via the computing device, each data container of a first set of data containers in volatile memory with a separate metadata page of a plurality of metadata pages, wherein each data container of the first set of data containers is configured to store metadata changes associated with a separate metadata page;
writing one or more metadata changes associated with a metadata page to the data container associated with the metadata page;
writing the one or more metadata changes stored in the first set of data containers to a storage array, wherein writing the one or more metadata changes stored in the first set of data containers to a storage array includes:
writing the one or more metadata changes stored in each data container to a separate data container page of a set of data container pages in the storage array, wherein each data container page is configured to store metadata changes associated with a separate metadata page of the plurality of metadata pages, and
writing the one or more metadata changes stored in the set of data container pages to the metadata page stored in a metadata page store of the storage array.

2. The computer-implemented method of claim 1, wherein writing the one or more metadata changes to the first set of data containers includes writing metadata changes to the first set of data containers until at least one data container of the first set of data container is full.

3. The computer-implemented method of claim 2, further comprising:
switching the first set of data containers with a second set of data containers when the at least one data container of the first set of data container is full; and
writing one or more subsequent metadata changes to the second set of data containers.

4. The computer-implemented method of claim 1, wherein associating each data container of the set of data containers with a metadata page is based upon, at least in part, a hash function of an index of the metadata page.

5. The computer implemented method of claim 4, further comprising:
determining a target data container for writing the one or more metadata changes based upon, at least in part, a hash function of an index of the metadata page associated with the one or more metadata changes.

6. The computer implemented method of claim 1, further comprising:
receiving a read request for a metadata page stored in the storage array;
identifying the data container from the first set of data containers in the volatile memory that is associated with the metadata page of the read request;
identifying one or more metadata changes from the identified data container;
reading the metadata page from the storage array;
merging the one or more identified metadata changes with the metadata page read from the storage array, thus defining a current metadata page; and
providing the current metadata page in response to the read request.

7. The computer implemented method of claim 1, further comprising:
combining a plurality of data container pages associated with a metadata page from a plurality of sets of data container pages in the storage array, thus defining a data container working set;
reading the metadata page from the metadata page store of the storage array;
merging the one or more metadata changes from the data container working set and the metadata page read from the metadata page store of the storage array, thus defining an updated metadata page; and
writing the updated metadata page to the metadata page store of the storage array.

8. A computer program product residing on a non-transitory computer readable medium having a plurality of instructions stored thereon which, when executed by a processor, cause the processor to perform operations comprising:
associating each data container of a first set of data containers in volatile memory with a separate metadata page of a plurality of metadata pages, wherein each data container of the first set of data containers is configured to store metadata changes associated with a separate metadata page;
writing one or more metadata changes associated with a metadata page to the data container associated with the metadata page;
writing the one or more metadata changes stored in the first set of data containers to a storage array, wherein writing the one or more metadata changes stored in the first set of data containers to a storage array includes:
writing the one or more metadata changes stored in each data container to a separate data container page of a set of data container pages in the storage array, wherein each data container page is configured to store metadata changes associated with a separate metadata page of the plurality of metadata pages, and
writing the one or more metadata changes stored in the set of data container pages to the metadata page stored in a metadata page store of the storage array.

9. The computer program product of claim 8, wherein writing the one or more metadata changes to the first set of data containers includes writing metadata changes to the first set of data containers until at least one data container of the first set of data container is full.

10. The computer program product of claim 9, further comprising:
switching the first set of data containers with a second set of data containers when the at least one data container of the first set of data container is full; and
writing one or more subsequent metadata changes to the second set of data containers.

11. The computer program product of claim 9, wherein associating each data container of the set of data containers with a metadata page is based upon, at least in part, a hash function of an index of the metadata page.

12. The computer program product of claim 11, further comprising:
determining a target data container for writing the one or more metadata changes based upon, at least in part, a hash function of an index of the metadata page associated with the one or more metadata changes.

13. The computer program product of claim 8, further comprising:
receiving a read request for a metadata page stored in the storage array;

identifying the data container from the first set of data containers in the volatile memory that is associated with the metadata page of the read request;
identifying one or more metadata changes from the identified data container;
reading the metadata page from the storage array;
merging the one or more identified metadata changes with the metadata page read from the storage array, thus defining a current metadata page; and
providing the current metadata page in response to the read request.

14. The computer program product of claim 8, further comprising:
combining a plurality of data container pages associated with a metadata page from a plurality of sets of data container pages in the storage array, thus defining a data container working set;
reading the metadata page from the metadata page store of the storage array;
merging the one or more identified metadata changes from the data container working set and the metadata page read from the metadata page store of the storage array, thus defining an updated metadata page; and
writing the updated metadata page to the metadata page store of the storage array.

15. A computing system including a processor and memory configured to perform operations comprising:
associating each data container of a first set of data containers in volatile memory with a separate metadata page of a plurality of metadata pages, wherein each data container of the first set of data containers is configured to store metadata changes associated with a separate metadata page;
writing one or more metadata changes associated with a metadata page to the data container associated with the metadata page;
writing the one or more metadata changes stored in the first set of data containers to a storage array, wherein writing the one or more metadata changes stored in the first set of data containers to a storage array includes:
writing the one or more metadata changes stored in each data container to a separate data container page of a set of data container pages in the storage array, wherein each data container page is configured to store metadata changes associated with a separate metadata page of the plurality of metadata pages, and
writing the one or more metadata changes stored in the set of data container pages to the metadata page stored in a metadata page store of the storage array.

16. The computing system of claim 15, wherein writing the one or more metadata changes to the first set of data containers includes writing metadata changes to the first set of data containers until at least one data container of the first set of data container is full.

17. The computing system of claim 16, further comprising:
switching the first set of data containers with a second set of data containers when the at least one data container of the first set of data container is full; and
writing one or more subsequent metadata changes to the second set of data containers.

18. The computing system of claim 15, wherein associating each data container of the set of data containers with a metadata page is based upon, at least in part, a hash function of an index of the metadata page.

* * * * *